United States Patent
Hioki et al.

(10) Patent No.: US 9,329,382 B2
(45) Date of Patent: May 3, 2016

(54) DISPLAY ELEMENT AND DISPLAY DEVICE INCLUDING A LIGHT GUIDE AND LIGHT EXTRACTOR

(75) Inventors: Tsuyoshi Hioki, Tokyo (JP); Yutaka Nakai, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1258 days.

(21) Appl. No.: 13/242,087

(22) Filed: Sep. 23, 2011

(65) Prior Publication Data
US 2012/0218778 A1    Aug. 30, 2012

(30) Foreign Application Priority Data

Feb. 28, 2011    (JP) .................................. 2011-042463

(51) Int. Cl.
*G02F 1/1335* (2006.01)
*G02B 26/08* (2006.01)
*F21V 8/00* (2006.01)

(52) U.S. Cl.
CPC .......... *G02B 26/0816* (2013.01); *G02B 6/0038* (2013.01)

(58) Field of Classification Search
CPC .......... G02B 26/0816; G02B 26/0038; G02B 26/0891; G02B 26/0875
USPC .......................................................... 349/61
See application file for complete search history.

(56) References Cited

U.S. PATENT DOCUMENTS

| 5,953,469 A * | 9/1999 | Zhou .................... G02B 6/1221 385/22 |
| 6,650,822 B1 | 11/2003 | Zhou |
| 8,496,369 B2 * | 7/2013 | Hioki .................... G02B 6/001 362/561 |
| 2008/0084600 A1 * | 4/2008 | Bita ..................... G02B 6/0035 359/290 |
| 2010/0177091 A1 | 7/2010 | Hioki et al. |
| 2012/0033432 A1 | 2/2012 | Hioki et al. |
| 2012/0327069 A1 * | 12/2012 | Nakai .................. G02B 26/004 345/212 |

FOREIGN PATENT DOCUMENTS

JP    2010-225692    10/2010

* cited by examiner

Primary Examiner — Tracie Y Green
(74) Attorney, Agent, or Firm — Oblon, McClelland, Maier & Neustadt, L.L.P (57) ABSTRACT

According to one embodiment, a display element includes a light guide and a light extraction unit. The light guide extends in one direction, and is optically transmissive. The light extraction unit includes a displacement layer, a reflective layer provided on the displacement layer, and a light extraction layer provided on the reflective layer to oppose the light guide. A plurality of prisms are formed in one major surface of the light extraction layer opposing the reflective layer. A trough line is formed between mutually-adjacent ridgelines. The element has at least one selected from a configuration in which an angle between one of the oblique surfaces and one other major surface of the light extraction layer opposing the light guide is different between corresponding oblique surfaces of two mutually-adjacent prisms and a configuration in which the ridgelines of the prisms are non-parallel to the trough line between the ridgelines.

10 Claims, 7 Drawing Sheets

DISPLAY ELEMENT AND DISPLAY DEVICE INCLUDING A LIGHT GUIDE AND LIGHT EXTRACTOR

CROSS-REFERENCE TO RELATED APPLICATIONS

This application is based upon and claims the benefit of priority from the prior Japanese Patent Application No. 2011-042463, filed on Feb. 28, 2011; the entire contents of which are incorporated herein by reference.

FIELD

Embodiments described herein relate generally to a display element and a display device.

BACKGROUND

FPDs (Flat Panel Displays), such as LCDs (Liquid Crystal Displays), PDPs (Plasma Display Panels), and OLEDs (Organic Light Emitting Displays), which are thin relative to the display surfaces are currently mounted in a wide range of information devices. Methods for manufacturing such FPDs mainly use a glass substrate as a support substrate; and the screen size is limited by the size of the glass substrate used when manufacturing.

Conversely, display devices are being considered in which the display surface is formed by multiply arranging a display element that includes a light source, a light guide configured to be a waveguide of the light from the light source, and a light extraction unit to extract the guided light locally and selectively from the interior of the light guide to the outside. A feature of such a display device is that manufacturing is possible without limits on the size due to the number of display elements that can be arranged. However, regarding problems of the display device, it is desirable to improve the directivity of the light extracted from the light guide.

DETAILED DESCRIPTION

According to one embodiment, a display element includes a light guide and a light extraction unit. The light guide extends in one direction, and is optically transmissive. The light extraction unit includes a displacement layer, a reflective layer provided on the displacement layer, and a light extraction layer provided on the reflective layer to oppose the light guide. The displacement layer is configured to perform a displacement operation due to an electrical signal. A plurality of prisms are formed in one major surface of the light extraction layer opposing the reflective layer. Each of the plurality of prisms is made of two oblique surfaces and a ridgeline interposed between the two oblique surfaces. A trough line is formed between mutually-adjacent ridgelines. The element has at least one selected from a configuration in which an angle between one of the oblique surfaces and one other major surface of the light extraction layer opposing the light guide is different between corresponding oblique surfaces of two mutually-adjacent prisms, and a configuration in which the ridgelines of the prisms are non-parallel to the trough line between the ridgelines.

According to another embodiment, a display element includes a light guide and a light extraction unit. The light guide extends in one direction, and is optically transmissive. The light extraction unit includes a displacement layer, a reflective layer provided on the displacement layer, and a light extraction layer provided on the reflective layer to oppose the light guide. The displacement layer is configured to perform a displacement operation due to an electrical signal. A plurality of prisms are formed in one major surface of the light extraction layer opposing the reflective layer. Each of the plurality of prisms is made of two oblique surfaces and a ridgeline interposed between the two oblique surfaces. A trough line is formed between mutually-adjacent ridgelines. At least one selected from the trough line and the ridgeline of the prisms has a curved-line portion when projected onto one other major surface of the light extraction layer.

According to one embodiment, a display device includes a display element, a plurality of light sources, and a drive circuit. The display element includes a light guide and a light extraction unit. The light guide extends in one direction, and is optically transmissive. The light extraction unit includes a displacement layer, a reflective layer provided on the displacement layer, and a light extraction layer provided on the reflective layer to oppose the light guide. The displacement layer is configured to perform a displacement operation due to an electrical signal. A plurality of prisms are formed in one major surface of the light extraction layer opposing the reflective layer. Each of the plurality of prisms is made of two oblique surfaces and a ridgeline interposed between the two oblique surfaces. A trough line is formed between mutually-adjacent ridgelines. The element has at least one selected from a configuration in which an angle between one of the oblique surfaces and one other major surface of the light extraction layer opposing the light guide is different between corresponding oblique surfaces of two mutually-adjacent prisms, and a configuration in which the ridgelines of the prisms are non-parallel to the trough line between the ridgelines. The plurality of light sources are provided at one end of the display elements respectively. The drive circuit is configured to provide the electrical signal to the light extraction unit.

According to one embodiment, a display device includes a display element, a plurality of light sources, and a drive circuit. The display element includes a light guide, and a light extraction unit. The light guide extends in one direction, is optically transmissive. The light extraction unit includes a displacement layer, a reflective layer provided on the displacement layer, and a light extraction layer provided on the reflective layer to oppose the light guide. The displacement layer is configured to perform a displacement operation due to an electrical signal. A plurality of prisms are formed in one major surface of the light extraction layer opposing the reflective layer. Each of the plurality of prisms is made of two oblique surfaces and a ridgeline interposed between the two oblique surfaces. A trough line is formed between mutually-adjacent ridgelines. At least one selected from the trough line and the ridgeline of the prisms has a curved-line portion when projected onto one other major surface of the light extraction layer. The plurality of light sources are provided at one end of the display elements respectively. The drive circuit is configured to provide the electrical signal to the light extraction unit.

Various embodiments will be described hereinafter with reference to the accompanying drawings.

The drawings are schematic or conceptual; and the relationships between the thicknesses and widths of portions, proportions of sizes among portions, etc., are not necessarily the same as the actual values thereof. Further, the dimensions and proportions may be illustrated differently among the drawings, even for identical portions.

Components similar to those described in regard to a drawing thereinabove are marked with like reference numerals, and a detailed description is omitted as appropriate.

First Embodiment

A display element and a display device which are a first embodiment will now be described.

Figure 1:
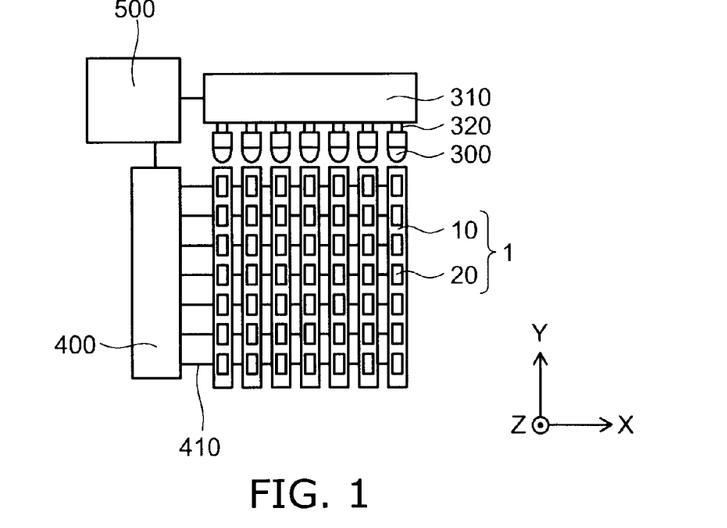
FIG. 1 is a schematic plan view of a display device according to a first embodiment.

FIG. 1 is a schematic plan view of the display device. The display device includes an image drive circuit 500 into which an image signal is input, a light source drive circuit 310 connected to the image drive circuit 500, and a scanning line drive circuit 400. The image drive circuit 500, to which the image signal (not illustrated) is introduced from the outside, performs signal conversion on the image signal to perform a display operation, sends a light source drive signal corresponding to the image signal to the light source drive circuit 310, and sends a scanning drive signal corresponding to the image signal to the scanning line drive circuit 400.

The display device further includes multiple light sources 300 arranged in the X direction, multiple display elements 1 provided to extend in the Y direction to oppose the light sources 300 respectively, and scanning interconnects 410 that are connected to the scanning line drive circuit 400 and extend in the X direction to be orthogonal to the display elements 1. The display element 1 includes a light guide 10 extending in the Y direction and light extraction units 20 provided at each of the intersections between the light guide 10 and the scanning interconnects 410. The light extraction units 20 are disposed on the back surface side of the light guide 10 in FIG. 1. The light sources 300 are connected to the light source drive circuit 310 via light source interconnects 320.

The light source 300 is capable of emitting light controlled by the light source drive circuit 310. The light emitted by the light source 300 propagates through the light guide 10 while undergoing total internal reflections from one end toward the other end.

The light extraction units 20 are connected to the scanning line drive circuit 400 via the scanning interconnects 410. The light extraction units 20 are capable of locally changing the total internal reflection state of the light guide 10 interface according to the scanning drive signal. Thereby, it is possible to select a light-extracting state and a non light-extracting state.

In this embodiment, it is taken that each of the light extraction units 20 forms one pixel.

A display device will be described in which, for example, M light sources 300 are arranged in the X direction and N light extraction units 20 are provided for each of the light guides 10 extending in the Y direction. Such a display device can display an M×N matrix of images having M pixels in the X direction and N pixels in the Y direction. The M light extraction units 20 arranged in the X direction are taken as one line. The light extraction of each of the light extraction units 20 included in one line is controlled; and switching is performed sequentially by line units from the first line of the uppermost Y direction portion to the Nth line of the lowermost portion. For example, an image display by line-scan driving is possible by performing the scanning operation at a high rate such that the frame rate is 60 Hz.

When displaying the ith line (i=1 to N), the light sources 300 emit light of the intensities and the colors corresponding to the image data of the ith line. These lights enter the light guides 10 and propagate through the light guides 10 in the Y direction. The light extraction units 20 are switched to the light-extracting state by the scanning drive signal for the light extraction operation being provided to the light extraction units 20 connected to the ith line synchronously with this light emission via the scanning interconnect 410. Thus, the light propagating through the light guides 10 is extracted locally and selectively from the ith light extraction units 20.

After a predetermined amount of time, the light corresponding to the (i+1)th image data is extracted from the (i+1)th light extraction units 20 by the light sources 300 emitting the light corresponding to the image data of the (i+1)th line and by the scanning drive circuit 400 supplying the scanning drive signal by selecting the (i+1)th scanning interconnect 410.

The M×N matrix of images can be displayed by the switching operation of the scanning lines recited above being performed sequentially for all of the scanning lines.

Figure 2:
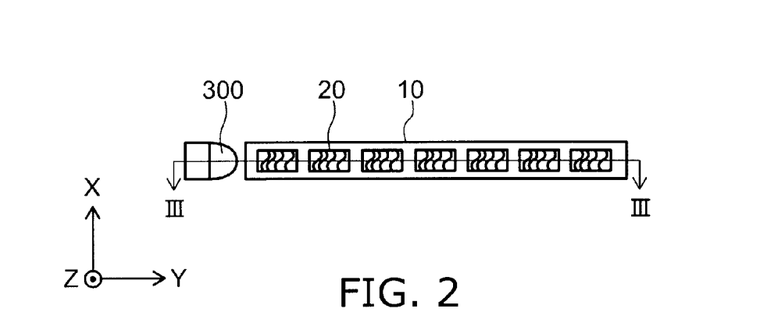
FIG. 2 is a schematic plan view showing the light source and the display element included in the display device of FIG. 1.

FIG. 2 is a schematic plan view illustrating the light source 300 and the display element 1 included in the display device of FIG. 1. In FIG. 2, the XY axis of FIG. 1 is rotated 90 degrees. An LED capable of emitting light in the visible region and having directivity in, for example, the Y direction may be used as the light source 300. A material having excellent transmissivity to the light of the wavelength region emitted from the light source 300 may be used as the light guide 10. A resin made of, for example, poly-methyl methacrylate (refractive index of approximately 1.5) may be used.

Figure 3:
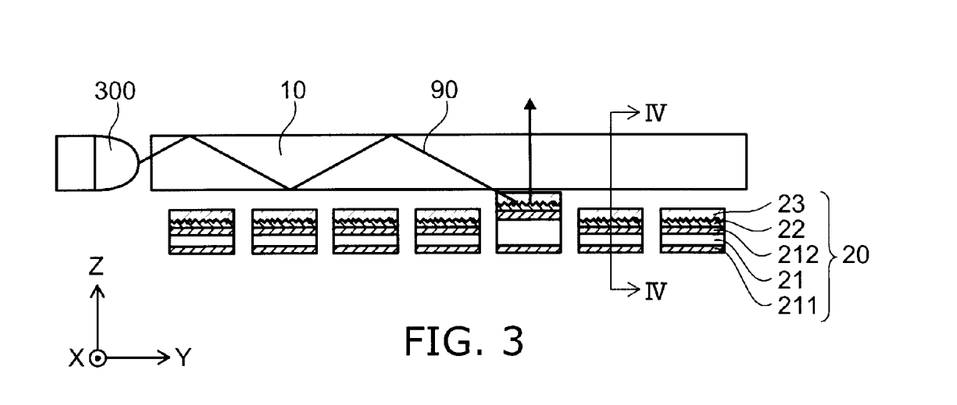
FIG. 3 shows a cross section along line III-III of the light source and the display element of FIG. 2.
Figure 4:
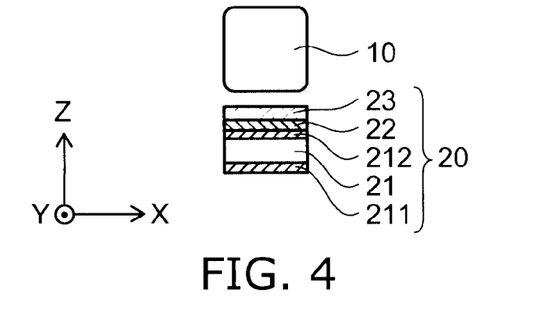
FIG. 4 is an enlarged view showing the cross section along line IV-IV of the display element of FIG. 3.

FIG. 3 illustrates a cross section along line III-III of the light source 300 and the display element 1 of FIG. 2. An example of the waveguide path of the light is schematically illustrated by a broken-line arrow 90. FIG. 4 is an enlarged view illustrating the cross section along line IV-IV of the display element of FIG. 3. The light extraction unit 20 includes: a pair of electrodes 211 and 212; a displacement layer 21 interposed between the pair of electrodes 211 and 212, where the displacement layer 21 is configured to perform a displacement operation due to the electrical signal; a reflective layer 22 provided on the electrode 212; and a light extraction layer 23 provided on the reflective layer 22. The light extraction layer 23 is disposed to oppose the light guide 10; and contact and non-contact with the light guide 10 can be selected by performing the displacement operation corresponding to the scanning drive signal.

Figure 5:
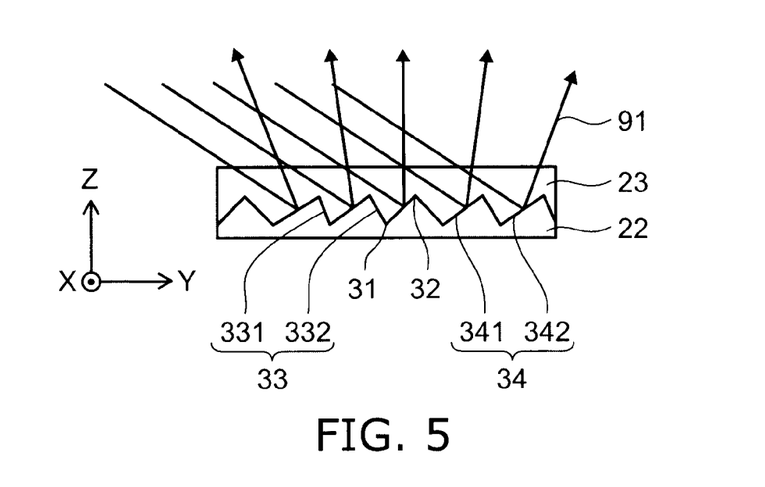
FIG. 5 shows the YZ cross section of the light extraction layer and the reflective layer.

FIG. 5 illustrates the YZ cross section of the light extraction layer 23 and the reflective layer 22. An example of the waveguide path of the light is schematically illustrated by broken-line arrows 91.

Multiple prisms are formed in the surface of the light extraction layer 23 opposing the reflective layer 22. The prism of the light extraction layer 23 is made of a first oblique surface 33, a second oblique surface 34, and a ridgeline 31 at the peak formed by the first oblique surface 33 and the second oblique surface 34. The trough lines 32 are formed between the ridgelines 31. The wavy lines of the light extraction units 20 of FIG. 2 illustrate the ridgelines 31 and the trough lines 32. The ridgelines 31 and the trough lines 32 are curved lines when projected onto the XY plane. The ridgelines 31 and the trough lines 32 extend in the X direction. Herein, the extension direction is the direction in which the line (the straight line) approximations of the ridgelines 31 and the trough lines 32 extend when projected onto the XY plane.

In the YZ cross section, the orientations of the corresponding oblique surfaces 33 are different between the prisms of the light extraction layer 23; and the orientations of the corresponding oblique surfaces 34 are different between the prisms of the light extraction layer 23. In other words, the angle between the XY plane and the first oblique surface 33 is different between the prisms illustrated in FIG. 5. For example, the angles between the XY plane and two first oblique surfaces 331 and 332 illustrated in FIG. 5 are different. Also, the angles between the XY plane and the second oblique surfaces 34 are different. For example, the angles between the XY plane and two second oblique surfaces 341 and 342 illustrated in FIG. 5 are different. Thus, the display element has a configuration in which the angle between one of the oblique surfaces and one other major surface of the light extraction layer opposing the light guide is different between corresponding oblique surfaces of two mutually-adjacent prisms.

Similarly to the light guide 10, the light extraction layer 23 may be formed of a material having excellent optical transmissivity in the wavelength region of the light source 300, e.g., a resin made of, for example, poly-methyl methacrylate. The light extraction layer 23 may include a material having a refractive index of about that of the light guide 10. When the light extraction layer 23 is caused to contact the light guide 10, the light inside the light guide 10 enters the light extraction layer 23. The reflective layer 22 may include silver (Ag) and/or aluminum (Al), which have excellent reflective characteristics in the wavelength region of the light source 300, in at least the surface contacting the light extraction layer 23. The silver and/or the aluminum may be formed on the prisms of the light extraction layer 23 with a film thickness of about 300 nm by a method using, for example, vacuum vapor deposition. In such a case, a configuration may be used in which the portions of the reflective layer 22 other than the silver and/or the aluminum are filled with a resin, etc.

A metal may be used as the electrodes 211 and 212. The displacement layer 21 may include, for example, a ferroelectric material such as lead zirconate titanate.

A light extraction operation method will now be described. The scanning drive signal as the control signal from the scanning drive circuit 400 is provided to the electrode 211 via the scanning interconnect 410. Here, in the case where the electrode 212 is fixed, for example, to ground, the potential difference between the electrode 211 and the electrode 212 is controllable. Here, a volume change of the displacement layer 21 is possible due to the potential difference; and the light extraction layer 23 can be caused to contact the light guide 10 by the displacement.

Of the seven light extraction units 20 illustrated in FIG. 3, the drive signal is sent to the fifth light extraction unit 20 from the left; the fifth light extraction unit 20 from the left is in the state of contacting the light guide 10 (the light-extracting state) due to the displacement layer 21 being displaced; the drive signal is not sent to the other light extraction units 20; and the displacement layers 21 of the other light extraction units 20 are in the state of non-contact with the light guide 10 (the non-extracting state). In the non-extracting state, there is a gap between the light extraction layer 23 and the light guide 10; and the light guide 10 is covered with air which has a refractive index of about 1. The light propagating through the light guide 10, which has a large refractive index, has a property of undergoing a total internal reflection at the interface between the light guide 10 having the large refractive index and air which has a small refractive index. Accordingly, the light inside the light guide 10 propagates while repeating total internal reflections.

A method for extracting the light from the light extraction unit 20 when the light extraction unit 20 is in the light-extracting state will now be described. As illustrated by the broken-line arrow 90 of FIG. 3, a portion of the light propagating through the light guide 10 while undergoing total internal reflections reaches the portion where the light extraction unit 20 that is in the light-extracting state contacts the light guide 10. This light enters the light extraction layer 23 without undergoing a total internal reflection at the surface of the light guide 10. This is because the light extraction layer 23 and the light guide 10 can be considered to be an optically continuous body because the refractive indexes of the light extraction layer 23 and the light guide 10 are substantially the same.

The light that has entered the light extraction layer 23 is regularly reflected at the interface between the light extraction layer 23 and the reflective layer 22. Here, the propagation direction of the reflected light can be changed at the interface between the light extraction layer 23 and the reflective layer 22 because the prisms are formed in the light extraction layer 23 as described above. The reflected light passes through the light guide 10 and is emitted to the outside of the light guide 10. In other words, the light is extracted from the portion of the light guide 10 on the side opposite to the light extraction unit 20.

Details of the light reflected at the interface between the light extraction layer 23 and the reflective layer 22 will be described separately for the YZ plane and the XZ plane.

First, the reflected light of the YZ plane that propagates in the Z direction while spreading in the Y direction will be described using FIG. 5. In this description, it is assumed that the light entering the light extraction layer 23 is parallel. The parallel light is reflected at the oblique surfaces 33 of the prisms of the light extraction layer 23 in directions different from directions at the oblique surfaces 34 because the oblique surfaces 33 are tilted at angles different from those for the oblique surfaces 34. In other words, reflected light that spreads in the Y direction can be obtained.

Figure 6:
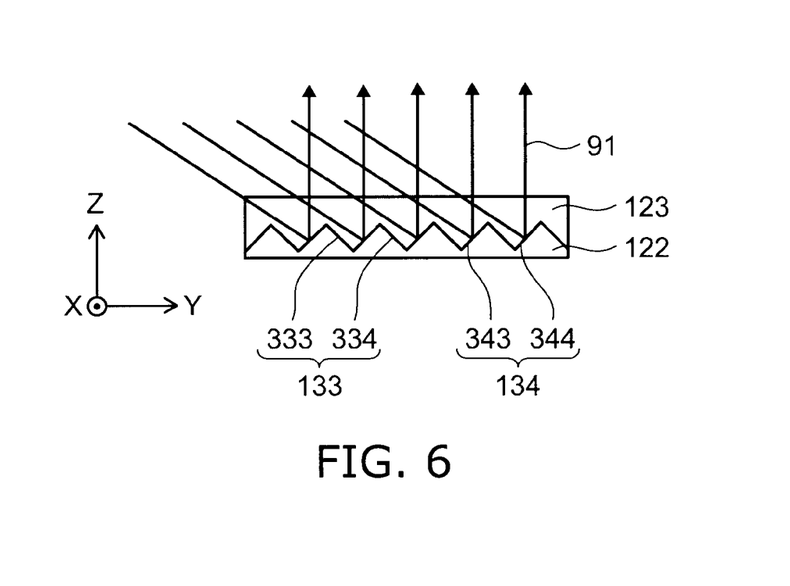
FIG. 6 shows the YZ cross sectional of a light extraction layer and a reflective layer of a comparative example.

On the other hand, FIG. 6 illustrates a YZ cross-sectional view of a light extraction layer 123 and a reflective layer 122 of a comparative example. An example of the waveguide path of the light is schematically illustrated by broken-line arrows 92. The light extraction layer 123 has multiple prisms in the surface opposing the reflective layer 122. All of the angles between the XY plane and corresponding oblique surfaces 133 of the prisms are the same; and all of the angles between the XY plane and corresponding oblique surfaces 134 of the prisms are the same. For example, the angles between the XY plane and two first oblique surfaces 333 and 334 illustrated in FIG. 6 are same. Also, the angles between the XY plane and two second oblique surfaces 343 and 344 are same. Therefore, the parallel light is regularly reflected in the same direction at the interface between such a light extraction layer 123 and reflective layer 122. Thus, the reflected light does not spread easily in the Y direction.

Figure 7:
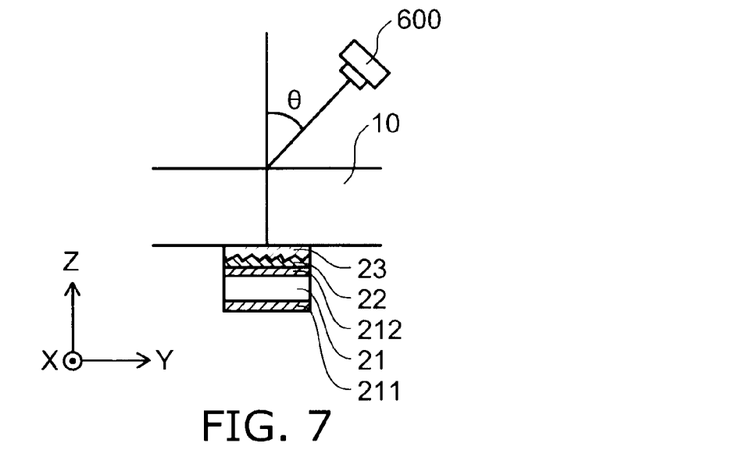
FIG. 7 is a YZ plane schematic view showing a measurement system for a viewing angle dependence of the display element.

Evaluation results of the viewing angle dependence of the display element 1 in the YZ plane for the light extraction unit 20 that includes the light extraction layer 23 and the reflective layer 22 of FIG. 5 and for the light extraction unit 20 that includes the light extraction layer 123 and the reflective layer 122 of FIG. 6 is as follows. FIG. 7 is a YZ plane schematic view illustrating the measurement system for the viewing angle dependence of the display element 1. Both of the light extraction units 20 were provided such that the extension directions of the prisms of the light extraction layers 23 and 123 were in the X direction. The light extraction layers 23 and 123 were parallel to the XY plane. The light extraction units 20 were in contact with the light guide 10. A light receiving element 600 was disposed at an angle θ from an axis along the line of the Z direction passing through the centers of the light extraction layers 23 and 123. The light receiving element 600 was moved in the YZ plane; and the intensity of the light extracted from the light guide 10 was measured.

Figure 8:
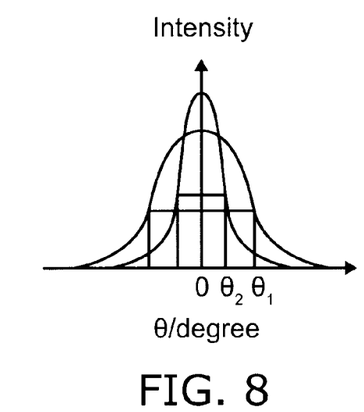
FIG. 8 shows the relationship between the angle θ of FIG. 7 and the intensity of the light extracted from the display element.

FIG. 8 illustrates the relationship between the angle θ of FIG. 7 and the intensity of the light extracted from the display element. The horizontal axis is the angle θ; the vertical axis is the intensity of the light; and the spread of the light in the Y direction is illustrated. The solid line illustrates the case where the light extraction unit 20 of FIG. 5 was used. The single dot-dash line illustrates the case where the light extraction unit 20 of the comparative example illustrated in FIG. 6 was used.

In the measurement results of the case of FIG. 5, the angle θ when the light intensity is half of the peak value (half width at half maximum: HWHM) is taken as θ1. In the measurement results of the case of FIG. 6, HWHM is taken as θ2. θ1 and θ2 have the relationship θ1>θ2. In other words, light that spreads in the Y direction can be obtained by the light extraction unit 20 of FIG. 5. Accordingly, the light intensity even when viewing the display device from any angle along the Y direction does not change easily. Thus, the viewing angle dependence of the display device in the Y-axis direction can be reduced.

Here, in the case of the light extraction unit 20 of FIG. 6, the spread of the viewing angle dependence is due to the directivity of the LED used as the light source 300.

The reflected light of the XZ plane that propagates in the Z direction while spreading in the X direction will now be described.

Figure 9:
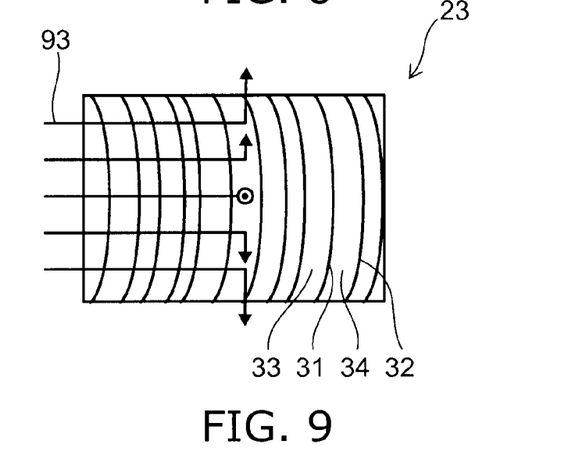
FIG. 9 shows a portion of the XY plane of the light extraction layer.

FIG. 9 illustrates a portion of the XY plane of the light extraction layer 23.

The trough lines 32 are illustrated by single dot-dash lines; and the ridgelines 31 are illustrated by double dot-dash lines. An example of the waveguide path of the light when projected onto the XY plane is illustrated schematically by broken-line arrows 93. The prisms are formed on the backside of the page surface of FIG. 9. The first oblique surfaces 33 and the second oblique surfaces 34 of the prisms have portions that include components not only in the Y direction and the Z direction but also in the X direction.

The reflective layer 22 is provided on the side of such a light extraction layer 23 toward the backside of the page surface; and light parallel to the YZ plane is caused to enter from above the light extraction layer 23. This light is regularly reflected at the interface between the light extraction layer 23 and the reflective layer 22. Here, it is taken that the light regularly reflected at the central portion of the light extraction layer 23 propagates in the Z direction. The light regularly reflected at the other portions has components not only in the Z direction but also in the X direction. Because the curvatures of the oblique surfaces 33 and 34 are different by position, the size of the X-direction component of the reflected light is different by the regularly-reflected position. In other words, reflected light that spreads in the X direction by position can be obtained. Thus, the display element has the configuration in which the ridgelines of the prisms are non-parallel to the trough line between the ridgelines.

Figure 10:
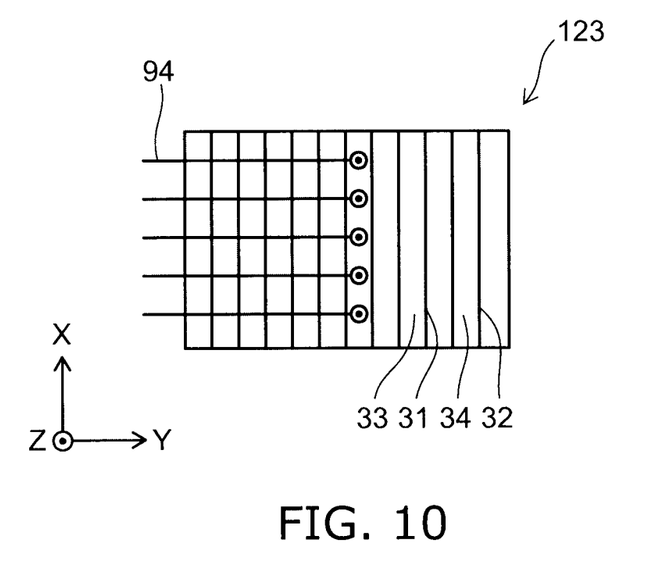
FIG. 10 shows a portion of the XY plane of the light extraction layer of the comparative example.

On the other hand, FIG. 10 illustrates a portion of the XY plane of the light extraction layer 123 of the comparative example. An example of the waveguide path of the light when projected onto the XY plane is schematically illustrated by broken lines 94. In this light extraction layer 123, ridgelines 131 and trough lines 132 of the prisms extend in straight line configurations in the X direction.

The light parallel to the YZ plane is caused to enter from above the light extraction layer 123 by disposing the reflective layer 122 on the side of such a light extraction layer 123 toward the backside of the page surface. This light is regularly reflected in one direction at the interface between the light extraction layer 123 and the reflective layer 122. Here, it is taken that the regularly-reflected light propagates in the Z direction.

Figure 11:
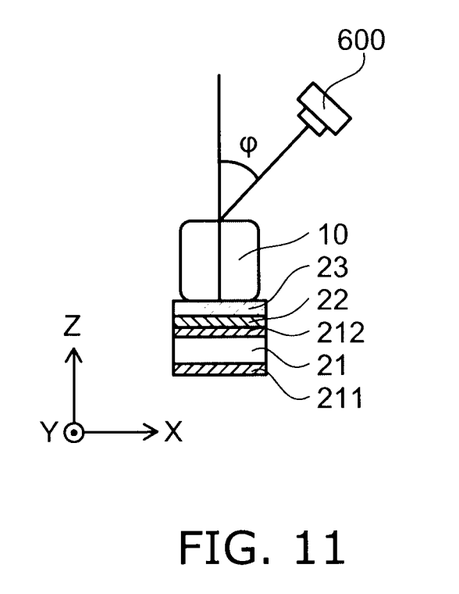
FIG. 11 is an XZ-plane schematic view showing the measurement system for the viewing angle dependence of the display element.

The evaluation results of the viewing angle dependence of the display element 1 in the XZ plane for the light extraction unit 20 that includes the light extraction layer 23 of FIG. 9 and for the light extraction unit 20 that includes the light extraction layer 123 of FIG. 10 are as follows. FIG. 11 is an XZ-plane schematic view illustrating the measurement system for the viewing angle dependence of the display element 1. Both of the light extraction units 20 were provided such that the prisms of the light extraction layers 23 and 123 extended in the X direction. The light extraction units 20 contacted the light guide 10. The light extraction layers 23 and 123 were provided parallel to the XY plane. The light receiving element 600 was disposed at an angle φ from an axis along the line of the Z direction passing through the centers of the light extraction layers 23 and 123. Using this measurement system, the intensity of the light extracted from the light guide 10 was measured using the light receiving element 600 at various angles φ.

Figure 12:
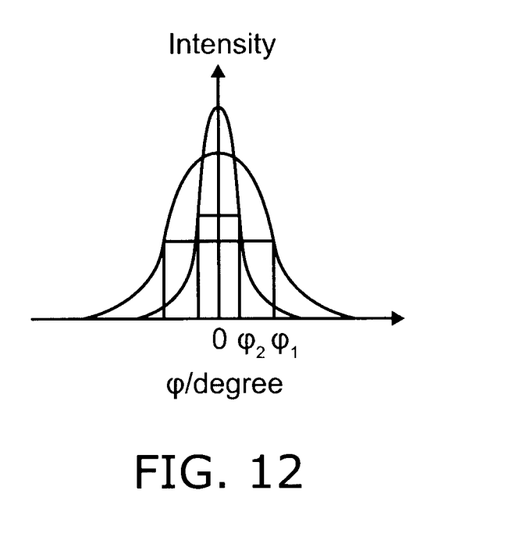
FIG. 12 shows the relationship between the angle φ of FIG. 11 and the intensity of the light extracted from the display element.

FIG. 12 illustrates the relationship between the angle φ of FIG. 11 and the intensity of the light extracted from the display element 1. The horizontal axis is the angle φ; the vertical axis is the intensity of the light; and the spread of the light in the X direction is illustrated. The solid line illustrates the case where the light extraction unit 20 illustrated in FIG. 9 was used. The single dot-dash line illustrates the case where the light extraction unit 20 illustrated in FIG. 10 was used.

In the measurement results of the case of FIG. 9, the HWHM is taken as φ1. In the measurement results of the case of FIG. 10, the HWHM is taken as φ2. φ1 and φ2 have the relationship φ1>φ2. In other words, the light that spreads in the X direction can be obtained by the ridgelines 31 and trough lines 32 of the prisms of the light extraction layer 23 having curved line configurations when projected onto the XY plane. According to the light extraction unit 20 that includes the light extraction layer 23 of FIG. 9, the viewing angle dependence of the display device in the X-axis direction can be reduced.

As recited above, in this embodiment, the surface of the light extraction layer 23 opposing the reflective layer 22 includes prisms having the ridgelines 31 and the trough lines 32 that are curved lines when projected onto the XY plane; and the reflected light having components in the X direction and the Y direction can be obtained because the angles of the oblique surfaces 33 of these prisms are different and the angles of the oblique surfaces 34 of these prisms are different. Accordingly, the light extracted by the light extraction units 20 spreads in the XY plane and has low viewing angle dependence in the X direction and the Y direction. In other words, the directivity of the light extracted from the light extraction units 20 can be improved.

It is favorable for the extension direction of the prisms of the light extraction layer 23 to be disposed substantially perpendicular to the extension direction of the light guide 10 with an angle not less than 75° and not more than 105°.

The viewing angle dependence is adjustable by adjusting the spacing and the period and/or the width of the curved configurations of the prisms of the light extraction layer 23.

Further, the display element may have at least one selected from the configuration in which the angle between one of the oblique surfaces and one other major surface of the light extraction layer opposing the light guide is different between corresponding oblique surfaces of two mutually-adjacent prisms; and the configuration in which the ridgelines of the prisms are non-parallel to the trough line between the ridgelines.

Second Embodiment

A display element of a second embodiment will now be described.

Other than the interface between the light extraction layer and the reflective layer, the configuration of the display element 1 is the same as that of the first embodiment. The configuration of the interface between a light extraction layer 223 and a reflective layer 222 will now be described.

Figure 13:
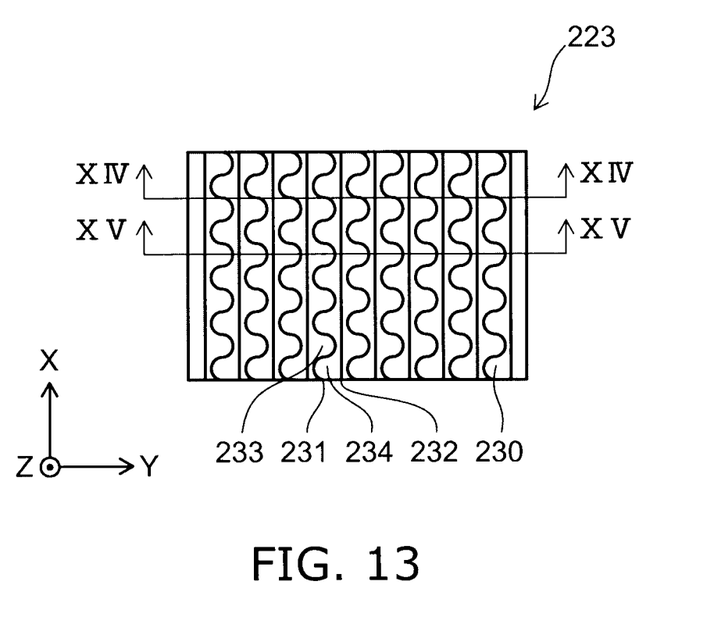
FIG. 13 shows the XY plane of the light extraction layer according to the second embodiment.

FIG. 13 illustrates the XY plane of the light extraction layer 223 according to the second embodiment. The prisms are formed on the backside of the page surface. The reflective layer is provided under the major surface where the prisms of the light extraction layer 223 are provided. Trough lines 232 are illustrated by single dot-dash lines; and ridgelines 231 are illustrated by double dot-dash lines. The trough lines 232 are straight lines parallel to the X direction; and the ridgelines 231 are curved lines when projected onto the XY plane. A prism 230 includes a first oblique surface 233, a second oblique surface 234, and the ridgeline 231 interposed between the first oblique surface 233 and the second oblique surface 234. The trough line 232 is formed between two ridgelines 231.

Figure 14:
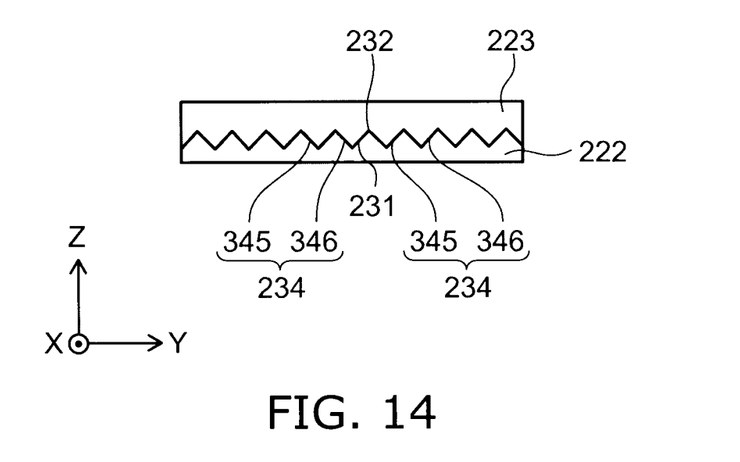
FIG. 14 shows a cross section along line XIV-XIV of the light extraction layer and the reflective layer of FIG. 13.

FIG. 14 is a cross section along line XIV-XIV of the light extraction layer 223 and the reflective layer 222 of FIG. 13.

Figure 15:
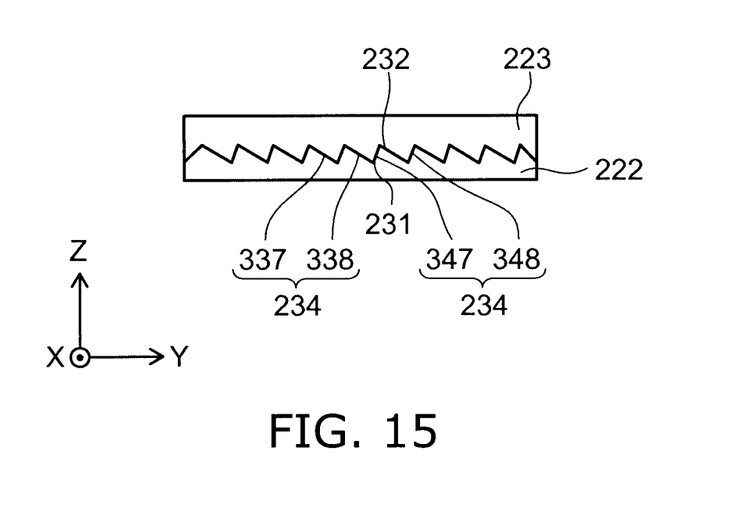
FIG. 15 shows a cross section along line XV-XV of the light extraction layer and the reflective layer of FIG. 13.

FIG. 15 is a cross section along line XV-XV of the light extraction layer 223 and the reflective layer 222 of FIG. 13.

In one cross section, the corresponding oblique surfaces 233 of the prisms of the light extraction layer 223 are parallel to each other; and the corresponding oblique surfaces 234 of the prisms of the light extraction layer 223 are parallel to each other. For example, in FIG. 14, two first oblique surfaces 335 and 336 are parallel to each other. Also, two second oblique surfaces 345 and 346 are parallel to each other. In FIG. 15, two first oblique surfaces 337 and 338 are parallel to each other. Also, two second oblique surfaces 347 and 348 are parallel to each other. Accordingly, the propagation direction of the light reflected by the prisms 230 is the same in the one cross section illustrated in FIG. 14; and the propagation direction of the light reflected by the prisms 230 is the same in the one other cross section illustrated in FIG. 15.

Comparing the cross section of FIG. 14 with the cross section of FIG. 15, the propagation direction of the reflected light is different between the cross sections because the tilt angles with respect to the XY plane of the oblique surfaces 233 and 234 of the prisms are different. For example, the tilt angles with respect to the XY plane of the first oblique surface 335 of FIG. 14 and the first oblique surface 337 of FIG. 15 are different. Also, the tilt angles with respect to the XY plane of the second oblique surface 345 of FIG. 14 and the second oblique surface 347 of FIG. 15 are different. Accordingly, the viewing angle dependence in the YZ plane inside one light extraction unit 20 can be reduced. Further, because the ridgelines 231 of the prisms are curved lines when projected onto the XY plane, the viewing angle dependence in the XZ plane can be reduced similarly to the first embodiment.

The viewing angle dependence of the reflected light in the X direction and the Y direction can be adjusted by changing the pitches between the trough lines 232 and the ridgelines 231, the curved configurations in the XY plane, the height of the prisms, etc.

An evaluation of the viewing angle dependence in the X direction and the Y direction using the display element 1 of this embodiment will now be described. The case is described where the relationship between the angle φ and the light intensity was measured similarly to FIG. 11 for the X direction, and the relationship between the angle θ and the light intensity was measured similarly to FIG. 7 for the Y direction. As a comparison, the evaluation of the display element 1 using the light extraction unit illustrated in FIG. 6 and FIG. 10 also was performed.

Figure 16:
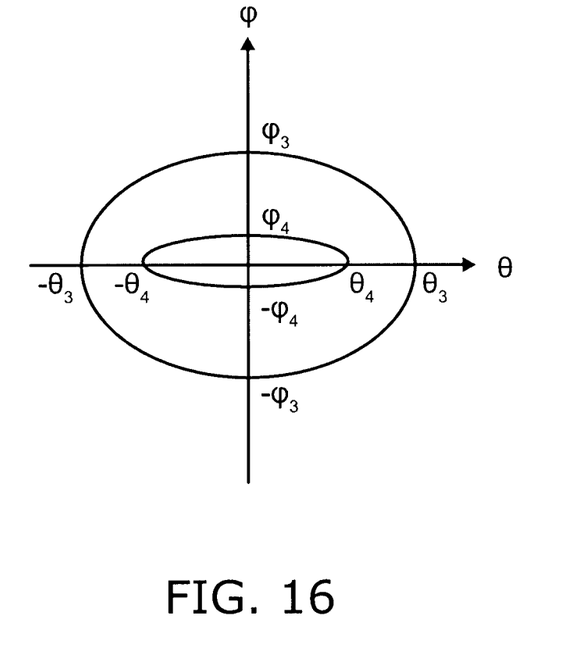
FIG. 16 shows the spread in the XY plane of the light of the light extraction unit in the XY plane.

In FIG. 16, the horizontal axis is the angle θ; the vertical axis is the angle φ; and the locus of (θ, φ) at which the HWHM is obtained is illustrated. Namely, FIG. 16 illustrates the spread in the XY plane of the light of the light extraction unit 20 in the XY plane. The solid line illustrates the display element 1 of the second embodiment; and the broken line illustrates the display element of the comparative example. For the display element 1 of the second embodiment, the HWHM of the Y direction when φ=0 are taken as θ3 and −θ3; and the HWHM of the X direction when θ=0 are taken as φ3 and −φ3. For the display element 1 of the comparative example, the HWHM of the Y direction when φ=0 are taken as θ4 and −θ4; and the HWHM of the X direction when θ=0 are taken as φ4 and −φ4.

As illustrated in FIG. 16, θ3>θ4 and φ3>φ4; and the range of the broken line is inside the range of the solid line. In other words, the viewing angle dependence in the X direction and the Y direction is lower for the display element 1 of the second embodiment than for the display element 1 of the comparative example. Thus, effects similar to those of the first embodiment can be obtained for the second embodiment as well.

Although the trough line 232 is a straight line and the ridgeline 231 is a curved line in the second embodiment, it is sufficient for at least one selected from the trough line 232 and the ridgeline 231 to have a curved-line portion; and the trough line 232 may be a curved line and the ridgeline 231 may be a straight line. It is also possible for the trough line 232 and the ridgeline 231 to be non-parallel straight lines or non-parallel curved lines.

Although the prisms of the light extraction layers 23 and 223 of the first embodiment and second embodiment extend perpendicularly to the extension direction of the light guide 10, similar effects can be obtained using other directions.

Although the first oblique surface and the second oblique surface of the prisms are straight lines in the YZ cross section in the first embodiment and the second embodiment, this is implementable with curved lines as well. In the case where the first oblique surface and the second oblique surface of the prisms are curved lines in the YZ cross section, it is favorable for the tilt angles of the tangents of the portions of the interfaces between the light extraction layers 23 and 223 and the reflective layers 22 and 222 where the light is reflected to be different between the prisms.

Hereinabove, exemplary embodiments of the invention are described with reference to specific examples. However, the embodiments of the invention are not limited to these specific examples. One skilled in the art may similarly practice the invention by appropriately selecting specific configurations of the components from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all display devices practicable by an appropriate design modification by one skilled in the art based on the display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display element, comprising:
   a light guide extending in one direction, the light guide being optically transmissive; and
   a light extraction unit including a displacement layer, a reflective layer provided on the displacement layer, and a light extraction layer provided on the reflective layer to oppose the light guide, the displacement layer being configured to perform a displacement operation due to an electrical signal,
   a plurality of prisms being formed in one major surface of the light extraction layer opposing the reflective layer, each of the plurality of prisms being made of two oblique surfaces and a ridgeline interposed between the two oblique surfaces, a trough line being formed between mutually-adjacent ridgelines,
   the element having at least one selected from:
      a configuration in which an angle between one of the oblique surfaces and one other major surface of the light extraction layer opposing the light guide is different between corresponding oblique surfaces of two mutually-adjacent prisms; and
      a configuration in which the ridgelines of the prisms are non-parallel to the trough line between the ridgelines;
   wherein at least one selected from the ridgeline and the trough line of one of the prisms has a curved-line portion when projected onto the one other major surface of the light extraction layer.

2. The element according to claim 1, wherein the prisms extend substantially perpendicularly to the extension direction of the light guide.

3. The element according to claim 1, wherein an angle between a direction of an extending direction of the prisms and the extension direction of the light guide is not less than 75 degrees and not more than 105 degrees.

4. The element according to claim 1, wherein one selected from the trough line and the mutually-adjacent ridgelines of the prisms is a straight line and one other selected from the trough line and the mutually-adjacent ridgelines of the prisms is a curved line when projected onto the one other major surface of the light extraction layer.

5. A display device, comprising:
   a display element including:
      a light guide extending in one direction, the light guide being optically transmissive; and
      a light extraction unit including a displacement layer, a reflective layer provided on the displacement layer, and a light extraction layer provided on the reflective layer to oppose the light guide, the displacement layer being configured to perform a displacement operation due to an electrical signal,
      a plurality of prisms being formed in one major surface of the light extraction layer opposing the reflective layer, each of the plurality of prisms being made of two oblique surfaces and a ridgeline interposed between the two oblique surfaces, a trough line being formed between mutually-adjacent ridgelines,
      the element having at least one selected from:
         a configuration in which an angle between one of the oblique surfaces and one other major surface of the light extraction layer opposing the light guide is different between corresponding oblique surfaces of two mutually-adjacent prisms; and
         a configuration in which the ridgelines of the prisms are non-parallel to the trough line between the ridgelines;
   a plurality of light sources provided at one end of the display elements respectively; and
   a drive circuit configured to provide the electrical signal to the light extraction unit.

6. The device according to claim 5, wherein at least one selected from the ridgeline and the trough line of one of the prisms has a curved-line portion when projected onto the one other major surface of the light extraction layer.

7. The device according to claim 6, wherein the prisms extend substantially perpendicularly to the extension direction of the light guide.

8. The device according to claim 6, wherein an angle between a direction of an extending direction of the prisms and the extension direction of the light guide is not less than 75 degrees and not more than 105 degrees.

9. The device according to claim 6, wherein one selected from the trough line and the mutually-adjacent ridgelines of the prisms is a straight line and one other selected from the trough line and the mutually-adjacent ridgelines of the prisms is a curved line when projected onto the one other major surface of the light extraction layer.

10. A display device, comprising:
a display element including:
- a light guide extending in one direction, the light guide being optically transmissive; and
- a light extraction unit including a displacement layer, a reflective layer provided on the displacement layer, and a light extraction layer provided on the reflective layer to oppose the light guide, the displacement layer being configured to perform a displacement operation due to an electrical signal,
- a plurality of prisms being formed in one major surface of the light extraction layer opposing the reflective layer, each of the plurality of prisms being made of two oblique surfaces and a ridgeline interposed between the two oblique surfaces, a trough line being formed between mutually-adjacent ridgelines,
- at least one selected from the trough line and the ridgeline of the prisms having a curved-line portion when projected onto one other major surface of the light extraction layer;

a plurality of light sources provided at one end of the display elements respectively; and a drive circuit configured to provide the electrical signal to the light extraction unit.

* * * * *